UNITED STATES PATENT OFFICE.

FREDERICK SALATHÉ, OF JERSEY CITY, NEW JERSEY, ASSIGNOR, BY MESNE ASSIGNMENTS, TO THE LITHO-CARBON COMPANY, OF NEW YORK, N. Y.

COMPOSITION OF MATTER FOR INSULATING PURPOSES.

SPECIFICATION forming part of Letters Patent No. 452,760, dated May 19, 1891.

Application filed November 12, 1890. Serial No. 371,120. (No specimens.)

*To all whom it may concern:*

Be it known that I, FREDERICK SALATHÉ, of Jersey City, in the county of Hudson and State of New Jersey, have invented a new and useful Composition of Matter for Insulating Purposes, of which the following is a specification.

This invention relates to that class of materials which from their property of resisting the passage of electricity are commonly termed "insulating" materials or "non-conductors."

It comprises the combination of a new and peculiar hydrocarbon product (which is of my own invention) with sulphur, whereby I provide a non-conductor capable of production at an extremely moderate cost and possessed of very great powers as an insulator or non-conductor of electricity.

My invention also comprises the combination, with the said hydrocarbon product, of india-rubber, gutta-percha, or oxidized linseed-oil, (the three last-named being for the purposes of my invention the equivalents of each other,) in connection with the sulphur, whereby my said new insulating material is better adapted for certain special purposes.

The nature and properties of my new hydrocarbon product, as well as the process by which it is obtained, are fully set forth and claimed by me in my application for Letters Patent filed March 6, 1891, bearing Serial No. 383,942, on which Letters Patent issue of even date herewith, and to which reference is hereby made for more complete information. It is sufficient here to say that the said hydrocarbon product is a resinoid hydrocarbon of the $C_{10}H_{16}$ series, which has substantially the following analysis: carbon, 88.23; hydrogen, 11.59; oxygen, .06; sulphur, trace, the same being a solid material with a specific gravity of from 1.000 to 1.028, tough and of a glossy jet black color, flexible and somewhat plastic at ordinary temperatures, soluble in naphtha, benzole, chloroform, bisulphide of carbon, partially in ether, completely in turpentine, rosin-oils, &c., capable of withstanding a temperature of 600° Fahrenheit and resisting alkalies and acids excepting concentrated nitric and concentrated sulphuric acids. It is obtained from a natural substance, which, so far as I am at present informed, is found in the State of Texas only, but which possibly may exist in other localities, the treatment which I employ for obtaining this product consisting, essentially, in first separating the crude natural substance from the sand or shell-rock in which it is found in nature by means of a solvent from the crude material thus obtained, and finally injecting steam or hot air into the said crude material in order to drive off the sulphur and volatile oil constituents which are combined therewith, as well as to supply the said material with the oxygen which is lacking in the natural substance, all as more fully set forth in my aforesaid application Serial No. 383,942.

In carrying out my present invention I proceed as follows: The hydrocarbon product and the requisite proportion of sulphur or of sulphur and india-rubber, or any of the specified equivalents of the latter, may be incorporated with each other in any suitable manner. Thus, for example, the hydrocarbon product may be brought to a molten condition and the other material or materials dissolved therein, and consequently incorporated therewith. The admixture should be as nearly homogeneous as practicable. When desired, the substances may be dissolved in a solvent capable of dissolving them in common and then mingled, the solvent being subsequently separated by the application of heat or otherwise. When the combined materials—the hydrocarbon product and sulphur, or these with the addition of india-rubber or any of its named equivalents—are subjected to the requisite degree of heat, the constituents of the mass are chemically combined and provide the substance embraced within my said invention. The proportions of sulphur and hydrocarbon product may be varied within wide limits, according to the special uses to which the new insulating material is to be applied. For covering electric wires above ground for non-conducting disks, &c., the proportion may be, say, fifty-five parts of the hydrocarbon product to five parts, by weight, of sulphur. When the said insulating material is to be used for the purposes above indicated, there may be added, say, five parts of infusorial earth, ten parts of ground glass and five parts of talc. These foreign substances simply increase the quantity of the resultant product, but do not form an essential part thereof.

The hydrocarbon product having incorporated with it the desired proportion of sulphur, which may be done when the litho-carbon product is in a semi-fluid or a molten condition and placed in a suitable mold or receptacle, is subjected to a heat of, say, from 250° to 325° Fahrenheit for a period which may vary with the size of the mass and the degree of temperature, but which in general may be an hour, more or less, the resultant product being a composition of matter, which as an insulator for electricity has all the valuable properties of vulcanized india-rubber or vulcanite ordinarily used for such purposes, but is capable of much cheaper production, and can be manufactured into insulating devices, articles, coverings, coatings, &c.

For articles liable to abrasion from use a proportion of india-rubber, gutta-percha, or oxidized linseed-oil should be incorporated with the litho-carbon product and the whole treated with sulphur, in a manner substantially the same as hereinbefore set forth. In such case the quantity of sulphur employed may vary from, say, two per cent. to twenty-five per cent. of the total of the other materials just named, according to the uses the product is intended to be employed. The india-rubber, gutta-percha, oxidized linseed-oil, &c., may be from, say, five to fifty per cent. of the whole.

Foreign materials—such as infusorial earth, &c.—may be employed, when desired, to increase the quantity of non-conducting material the same as when the litho-carbon product and the sulphur alone are employed.

What I claim as my invention is—

1. The composition of matter consisting, essentially, of the herein-described hydrocarbon product and sulphur, substantially as herein described.

2. The composition of matter consisting of the herein-described hydrocarbon product, sulphur, and india-rubber, gutta-percha, or oxidized linseed-oil, the whole united and combined substantially as herein set forth.

FREDERICK SALATHÉ.

Witnesses:
CHARLES TAYLOR,
JOHN C. DICKINSON.

It is hereby certified that the assignee, "The Litho-Carbon Company," in Letters Patent No. 452,760, granted May 19, 1891, upon the application of Frederick Salathé, of Jersey City, New Jersey, for an improvement in "Compositions of Matter for Insulating Purposes," should have been described and specified as *The Litho-Carbon Company, a corporation of the State of New Jersey*, instead of "The Litho-Carbon Company, of New York, N. Y.;" and that the said Letters Patent should be read with this correction therein that the same may conform to the record of the case in the Patent Office.

Signed, countersigned, and sealed this 16th day of June, A. D. 1891.

[SEAL.]

CYRUS BUSSEY,
*Assistant Secretary of the Interior.*

Countersigned:
C. E. MITCHELL,
*Commissioner of Patents.*